F. B. CHARROIN.

VALVE CONTROLLED CONNECTOR FOR AIR CONDUITS.

APPLICATION FILED MAR. 28, 1918.

Reissued July 23, 1918. 14,494.

WITNESS :

René Bruine

INVENTOR :

Frank B. Charroin

By Attorneys,

Fraser, Dunlap & Myers

UNITED STATES PATENT OFFICE.

FRANK B. CHARROIN, OF SEATTLE, WASHINGTON.

VALVE-CONTROLLED CONNECTOR FOR AIR-CONDUITS.

14,494. Specification of Reissued Letters Patent. Reissued July 23, 1918.

Original No. 1,189,191, dated June 27, 1916, Serial No. 31,126, filed May 29, 1915. Application for reissue filed March 28, 1918. Serial No. 225,326.

*To all whom it may concern:*

Be it known that I, FRANK B. CHARROIN, citizen of the United States, residing at Seattle, in the county of King and State of Washington, have invented a certain new and useful Improvement in Valve-Controlled Connectors for Air-Conduits, of which the following is a specification.

My invention relates to improvements in connectors for making temporary connections between flexible conductors of compressed air and check-valve controlled passageways leading into receptacles that are to be charged with such compressed air; and the object of my improvement is to provide a connector which may be attached to one end of a hose whose other end is connected with a source of compressed air, and which shall embody a valve that shall be actuated to open the passageway through it when its outlet end is pressed into engagement with a suitable nipple that forms the inlet passageway of a pneumatic tire of a vehicle or other receptacle to be charged with compressed air, said valve being adapted to close automatically upon disengagement from said nipple.

I accomplish this object by devices illustrated in the accompanying drawings wherein—

Figure 2:
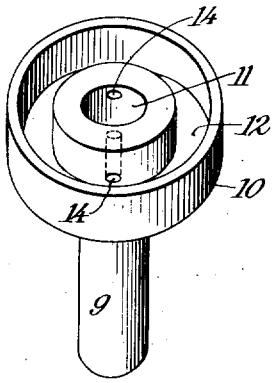
Fig. 2 is an enlarged perspective view of a detail of the same.

Referring to the drawings, throughout which like reference numerals indicate like parts, a valve-case 4 is provided with an integral inlet nipple 5 disposed at a right angle with respect to the axis thereof to adapt it to be attached to an end of a flexible hose and further provided with a removable internally screw-threaded clamping cap or collar 6 disposed on its outlet end forming a partial closure therefor and serving to clamp a disk or gasket 7 of flexible material, as of soft vulcanized rubber, to the outer annular surface of the outlet end of the circular wall of said valve-case 4, said gasket 7 being provided with a concentrically disposed orifice 8 through which a jet of compressed air may pass. Within the valve-case 4 is disposed a valve spindle 9 whose lower end is provided with an integral disk-like valve member 10 whose bottom face is provided with a centrally disposed recess 11 and with a concentrically disposed annular recess 12 which bottom face is normally maintained in engagement with the inner side surface of the flexible gasket 7 by means of a helical compression spring 13 which surrounds the spindle 9 to extend from the disk-like valve member 10 to a shoulder formed on the interior surface of the valve-case 4. The form of the valve-spindle 9 and the disk-like valve member 10 is more clearly shown by perspective view in Fig. 2.

The valve member 10 is provided with a plurality of holes 14 which extend through the wall which separates the recesses 11 and 12 whereby air may flow from the recess 12 to the recess 11 to gain access to the orifice 8 in the flexible gasket 7. The valve-spindle 9 and the disk-like valve member 10 are of such smaller diameters than the integral diameters of the wall of the valve-case 4 adjacent thereto, that always air may find passageway from the inlet nipple 5 to the annular surface of the flexible gasket 7 between the outer edge portion of the disk-like valve member 10 and the inner edge portion of the annular face of the outlet end of said valve-case 4.

Figure 3:
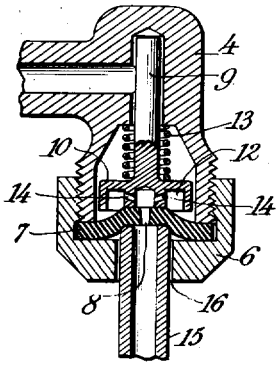
Fig. 3 is a fragmentary view in vertical mid-section of the same, showing positions of operative parts when the connector is in engagement with a nipple forming a passageway to a receptacle (not shown) to be charged with compressed air.

The hole or opening 16 through the cap or collar 6 is of such diameter as will adapt it to permit the insertion of a nipple, as the nipple 15 shown in Fig. 3, which nipple 15 may represent a nipple forming a part of the shell or stem of a tire-valve (*i. e.*, a check-controlled passageway leading into a pneumatic tire) and the thickness of the metal between the gasket 7 and the outer face of said collar 6 is such that the hole 16 will be a length that will adapt it to guide said nipple 15 as such nipple 15 is inserted within said hole 16, to cause its end surface to be seated in even engagement with the outer surface of the flexible disk 7.

Figure 1:
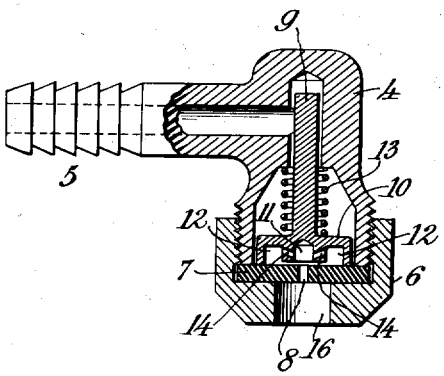
Figure 1 is a view in vertical mid-section of a connector embodying any invention.

The operation of my connector may be described as follows:—The nipple 5 is inserted in one end of a flexible hose and securely clamped therein by suitable binding means, the other end of said hose being connected with a source of supply of compressed air whereupon such compressed air, with the aid of the helical spring 13, will force the disk 10 in engagement with the flexible gasket 7 in the position shown in Fig. 1, whereby no air can find access to the orifice 8 by reason of the outer annular surface of the lower face of the disk-like valve member 10 being in engagement with the inner flat surface of the flexible gasket 7, then the connector is forced on to the end of the nipple or stem 15 of a tire valve, of a pneumatic tire which is to be inflated, whereby the end surfaces of said nipple will press the flexible gasket 7 to bulge inwardly, thus pressing inwardly the disk-like valve member 10 against the force of the helical spring 13 and the pressure of compressed air to the position shown in Fig. 3, thus to cause the outer annular portion of the adjacent outer face of the disk-like valve member 10 to disengage from its contact with the inner surface of the flexible gasket 7 while the inner annular portion of said adjacent outer face of said disk-like valve member 10 will be caused to engage with said gasket 7; and with the operative parts in such relative positions compressed air may pass from the nipple 5 into the interior of the valve-case 4, thence through the space between the periphery of the valve member 10 and the wall of the valve-case 4 into the annular recess 12, thence through the holes 14 into the recess 11, thence through the orifice 8 into the passageway through the nipple 15 of the tire valve, thence through the check-valve (not shown) therein to the space within the pneumatic tire to be inflated, and when such tire is sufficiently inflated the connector is detached from the nipple 15, whereupon the flexible gasket 7 will reassume its position in a flat plane, as shown in Fig. 1, whereby the outer annular portion of the outer face of the disk-like valve member 10 will again engage with the inner surface of the gasket 7 to prevent in an obvious manner air from gaining access to the orifice 8 through the annular recess 12 and holes 14.

My invention provides a highly desirable construction of hose coupling for use in inflating pneumatic tires or for analogous purposes, which introduces certain novel and important advantages. The flexible gasket being confined only at its margin, and having its central orifice too small to be entered by the nipple of the tire valve (or other nipple), affords, when the coupling is pressed against such nipple so as to bulge the gasket inwardly, a yielding contact which makes a highly effective packing for preventing leakage of air between the end of the nipple and the gasket. The packing joint thus made is tightened not only by the pressure of the nipple against the gasket, but also by the internal air pressure against the gasket. Such packing is effective even if the nipple, instead of pressing uniformly against the gasket, is somewhat tilted or out of true. Any such tilting of the nipple is, however, limited by the guiding hole 16 which prevents such excessive tilting as might impair the effective packing between the gasket and nipple. An important advantage of this construction is that the gasket is so nearly free from wear or abrasion that it has an imprecedentedly long period of useful life. The gasket also, by receiving on its inner face the contact of the valve member 10, affords a yielding seat for the latter and causes it to seat tightly to prevent waste of air when the coupling is out of use. Thus, in the preferred construction shown the gasket serves a threefold purpose, namely, to make an air-tight joint with the nipple or valve stem, to make an air-tight seat with the internal check valve, and to make an air-tight joint at its marginal connection with the casing 4.

Manifestly, changes may be made in the forms, dimensions and arrangement of parts of my invention without departing from the spirit thereof.

For example, it is not essential that the member 6 be constructed as a cap having internal threads engaging external threads on the casing; nor is the invention in its broader aspect limited to the specific construction of check valve 10, nor to such check-valve seating directly against the gasket.

What I claim is:

1. In a hose coupling, a casing formed with a chambered recess having cylindrical side walls and a tubular nipple communicating with said recess; a cap secured over said casing to inclose said recess, said cap being provided with an opening axially of said recess; a gasket of flexible material secured between said casing and said cap, said gasket being provided with a concentrically disposed orifice extending therethrough, a valve member disposed within said recess, said valve member being of a smaller diameter and of shorter length than said recess, and being provided with an annular recess and a concentrically disposed recess in one of its end surfaces adjacent to the inner side of said gasket to provide two concentrically disposed walls, the face of the outer wall projecting beyond the plane of the face of the inner wall whereby only said outer wall may engage with said gasket when said gasket is in its normal shape and whereby only said inner wall may engage with said gasket when said gasket is pressed inwardly to form a concavo-convex shape; and a passageway for air disposed to extend through said inner annular wall.

2. In a hose coupling, a casing formed with a chambered recess having cylindrical side walls and a tubular nipple communicating therewith, a cap secured over said casing inclosing said recess and provided with an opening axially of said recess, a gasket secured between said casing and said cap having an opening in the axis of said recess, and a valve member arranged for limited longitudinal movement within said recess, said valve member being of smaller diameter than said recess, to afford a passageway for air, and being chambered on its underside to provide a circular edge engageable with said gasket, the said gasket arranged to be engaged and moved to concavo-convex position to unseat the valve.

3. In a hose coupling, a casing formed with a chambered recess having cylindrical side walls and a tubular nipple communicating therewith, a cap secured over said casing inclosing said recess provided with an opening axially of said recess, a gasket secured between said casing and said cap having an opening in the axis of said recess, and a valve member arranged for limited longitudinal movement within said recess provided with means upon its upper side to prevent the closing of the passage into said nipple, said valve member being of smaller diameter than said recess to afford a passageway for air and being chambered on its underside to provide a circular edge engageable with said gasket, the said gasket arranged to be engaged and moved to concavo-convex position to unseat the valve.

4. In a hose coupling for inflating pneumatic tires or the like, a casing having a passage for compressed air, and a flexible gasket secured marginally to said casing adapted to contact with the end of the nipple of a tire valve or the like and to be flexed inwardly thereby to make a packed joint therewith, and having an orifice too small to permit the passage through it of said nipple, whereby a portion of the gasket overlies the end of the nipple.

5. In a hose coupling for inflating pneumatic tires or the like, a casing having a passage for compressed air, and a flexible gasket secured marginally to said casing adapted to contact with the end of the nipple of a tire valve or the like and to be flexed inwardly thereby to make a packed joint therewith, and having an orifice too small to permit the passage through it of said nipple, and a valve in said casing adapted to be unseated by pressure from said nipple.

6. In a hose coupling for inflating pneumatic tires or the like, a casing having a passage for compressed air, and a flexible gasket secured marginally to said casing adapted to contact with the end of the nipple of a tire valve or the like and to be flexed inwardly thereby to make a packed joint therewith, and having an orifice too small to permit the passage through it of said nipple, and an outwardly seating valve in said casing normally seating against the inner face of said gasket.

7. In a hose coupling for inflating pneumatic tires or the like, a casing having an inlet for compressed air, with a member partly closing the outlet from the casing, a flexible gasket secured marginally to said casing, said closure partly supporting said gasket against internal pressure, and the unsupported portion of said gasket adapted to contact with the end of the nipple of a tire valve or the like and to be flexed inwardly thereby to make a packed joint therewith, and having an orifice too small to permit the passage through it of said nipple.

8. In a hose coupling for inflating pneumatic tires or the like, a casing having an inlet for compressed air, with a member partly closing the outlet from the casing, a flexible gasket secured marginally to said casing, said closure partly supporting said gasket against internal pressure, and the unsupported portion of said gasket adapted to contact with the end of the nipple of a tire valve or the like and to be flexed inwardly thereby to make a packed joint therewith, and having an orifice too small to permit the passage through it of said nipple, and an outwardly seating valve in said casing normally seating against the inner face of said gasket where the latter is supported by said member.

9. In a hose coupling for inflating pneumatic tires or the like, a casing having a passage for compressed air, and a flexible gasket secured marginally to said casing adapted to contact with the end of the nipple of a tire valve or the like and to be flexed inwardly thereby to make a packed joint therewith, and having an orifice too small to permit the passage through it of said nipple, whereby a portion of the gasket overlies the end of the nipple, said casing having at its outlet a partial closure having a hole or opening adapted to guide such nipple.

10. In a hose coupling for inflating pneumatic tires or the like, a casing having a passage for compressed air, and a flexible gasket secured marginally to said casing adapted to contact with the end of the nipple of a tire valve or the like to make a packed joint therewith, and having an orifice so small that a portion of the gasket overlies the end of the nipple when in operative position.

11. In a hose coupling for inflating pneumatic tires or the like, a casing having a passage for compressed air, and a flexible gasket secured marginally to said casing adapted to contact with the end of the nipple of a tire valve or the like to make a packed joint therewith, and having an orifice so small that a portion of the gasket overlies the end of the nipple when in operative position, and a valve in said casing adapted to be unseated by pressure from said nipple.

12. In a hose coupling for inflating pneumatic tires or the like, a casing having a passage for compressed air, and a flexible gasket secured marginally to said casing adapted to contact with the end of the nipple of a tire valve or the like to make a packed joint therewith, and having an orifice so small that a portion of the gasket overlies the end of the nipple when in operative position, and an outwardly seating valve in said casing normally seating against the inner face of said gasket.

In witness whereof I have hereunto signed my name.

FRANK B. CHARROIN.